United States Patent [19]

Day, Sr. et al.

[11] 4,045,076
[45] Aug. 30, 1977

[54] SYSTEM FOR REMOVABLY SECURING SOUND-PROOFING MATERIAL TO A CONSTRUCTION VEHICLE

[75] Inventors: Lloyd Franklin Day, Sr., West Linn; Jarvis Cathralle Buxton, Portland; Lary Hester Oliver, Portland; Randall Jay Le Neve, Portland, all of Oreg.

[73] Assignee: Portland Wire & Iron Works, Portland, Oreg.

[21] Appl. No.: 671,060

[22] Filed: Mar. 29, 1976

[51] Int. Cl.$^2$ ............................................... E04B 1/74
[52] U.S. Cl. ................................. 296/39 A; 151/41.7; 85/35
[58] Field of Search ................. 296/39 A; 151/41.7; 85/35

[56] References Cited

U.S. PATENT DOCUMENTS

| | | | |
|---|---|---|---|
| 2,385,296 | 9/1945 | Moore | 151/41.7 X |
| 3,802,476 | 4/1974 | Hoadley | 151/41.7 |
| 3,829,150 | 8/1974 | Moore | 296/39 A |

*Primary Examiner*—Philip Goodman
*Attorney, Agent, or Firm*—Tilton, Fallon, Lungmus, Chestnut & Hill

[57] ABSTRACT

The system includes a flexible button top which has a sleeve appurtenance which is force-fitted over an externally helically grooved stud assembly having an integral self-adhesive back mounting plate. The button top is flexible enough so that it can be applied to, and removed from the stud assembly without the use of a tool, yet it is hard enough so that the stud will not perforate the flexible button top when impacted. The adhesive-backed stud assembly includes a helically threaded metallic screw perpendicularly attached to a metallic circular disc with a plastic foam backing impregnated with adhesive. The adhesive backing is covered by a release film prior to use. The adhesive-backed stud assembly can be applied without the use of a tool.

7 Claims, 3 Drawing Figures

SYSTEM FOR REMOVABLY SECURING SOUND-PROOFING MATERIAL TO A CONSTRUCTION VEHICLE

BACKGROUND OF THE INVENTION

The present invention relates to construction vehicles; and more particularly it relates to apparatus for attaching sound-proofing, thermal insulating, vibration absorbing or decorative trim material in enclosed areas of the vehicle. Such areas may include an engine housing or the like; but the primary area of application is in the operator's cab of a construction vehicle so as to isolate the operator from external noise, heat, cold, vibration or other ambient conditions to enhance his safety and comfort.

In the past, a sheath or covering of sound-proofing material has been applied to the interior of the operator's cabs of construction vehicles by various methods, all of which are time-consuming and sometimes require the use of relatively expensive and complex associated equipment. In addition, some of these methods are impractical in use of field application. U.S. Pat. No. 3,829,150 discloses a prior art arrangement in which threaded weld studs are welded in situ to the walls of the vehicle and a button is force-fitted onto the weld stud to hold the sound-proofing material in place.

SUMMARY OF THE INVENTION

An object of the invention is to provide apparatus in which installation of sound-proofing material or the like in a vehicle is greatly simplified.

The present invention provides for attaching a sheath of sound-proofing or other sheet-like material to a vehicle wall by means of a plurality of fasteners, each including a stud assembly comprising an externally grooved metal stud or screw adhered at its base to the wall by means of a specially designed adhesive-backed disc and a one-piece holding cap or button of resilient material.

In a specific embodiment, the adhesive-backed stud assembly includes a metallic helically grooved screw, concentrically located on a metallic disc or mounting plate. A foam plastic or rubber material impregnated with a pressure-sensitive adhesive is located on the back side of the mounting plate. The front of the mounting plate is provided with a conical offset which in turn defines a circular opening for receiving and holding the head of the screw. The screw is chemically bonded or mechanically secured to this cone, thus permitting a construction which is strong enough to hold the sound-proofing material, yet will yield upon impact, such as when a vehicle operator's head may strike it. An additional advantage of the circular cone construction is that it permits a variety of screw lengths to be used. The attaching structure includes a cellular foam plastic (polyurethane) or rubber material which is impregnated with a pressure-sensitive adhesive material. The adhesive back is protected until application with a release film easily removed at the time of application. The foam material is of the easily-deformable, resilient type offering several advantages of conforming to the shape of the area to which it is applied, energy absorption, and resistance to shock and vibration. The adhesive has been selected for its resistance to heat, cold, moisture, vibration and shock.

With the present invention the stud assembly can be installed by simply removing the release cover and pressing the exposed surface of the adhesive backing to the proper area of the mounting surface. The process of installation of the stud requires no auxiliary tools or equipment. Further, the installation time required is shorter than previous methods, and avoids the use of cumbersome and expensive stud-welding machines.

The adhesive-backed stud assembly can be installed on the wall of the construction vehicle with normal contact pressure and is removable by severing the adhesive material from the wall or panel of the vehicle. The entire assembly of the discs, sound-proofing, thermal insulating, vibration absorbing, decorative and/or other material is readily and completely removable as required as opposed to the permanent forms of weld studs. Features of easy, rapid application of the adhesive-backed disc stud without cumbersome and expensive application equipment makes it ideal for economic installation where it is impractical to use other methods.

Other features and advantages of the present invention will be apparent to persons skilled in the art from the following detailed description of a preferred embodiment accompanied by the attached drawing.

THE DRAWING

DETAILED DESCRIPTION

Figure 1:
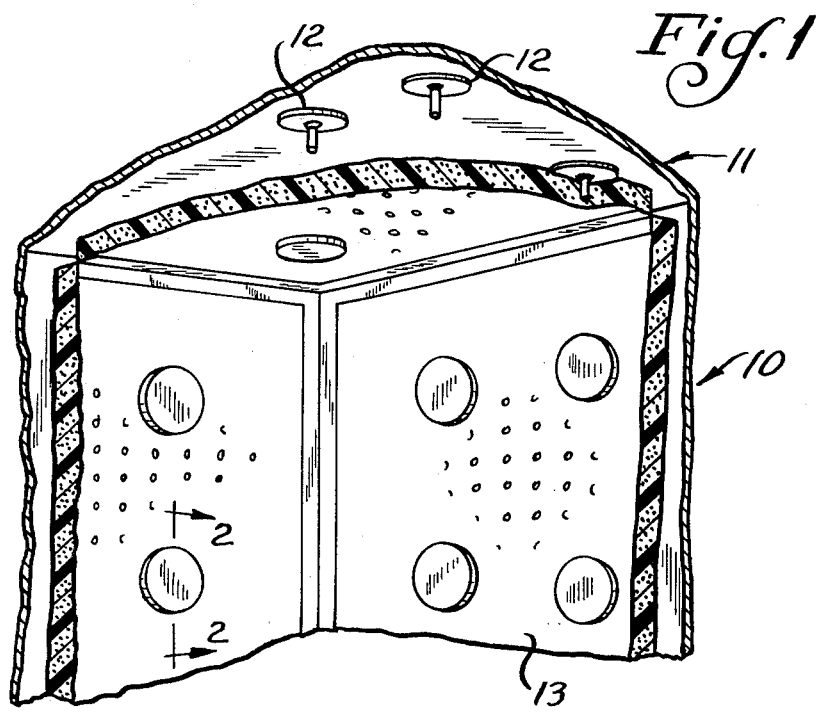
FIG. 1 is a fragmentary lower perspective view of a corner of an operator's cab for a construction vehicle equipped with sound-proofing material secured to the wall in accordance with the present invention.
Figure 3:
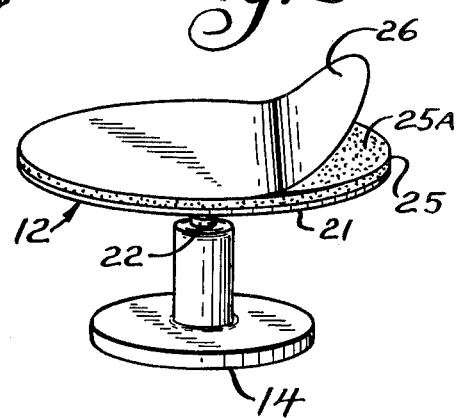
FIG. 3 is a perspective view of an adhesive-backed stud according to the present invention, showing the release material partly removed in preparation for installation.

Referring to FIG. 1, there is shown an upper corner of a fragment of an operator's cab of a construction vehicle wherein wall panels are generally designated 10 and a ceiling 11. It will be appreciated that both the wall 10 and ceiling 11 may be metal panels supported by the frame of a rollover protective system. However, as mentioned above, the present invention could also be used on the interior of an engine housing to suppress the transmission of noise, vibration, temperature extremes, etc. The vehicle may be of a type used for earth-moving, logging, industrial, agricultural, other construction purposes, or even highway trucks.

In the embodiment of FIG. 1, the panels of the wall and ceiling are provided with adhesive-backed stud assemblies 12 at spaced locations. The interior of the wall and ceiling panels 10, 11 are covered with sound-suppression material 13 (the material 13 could also be thermal insulating), vibration absorbing, decorative trim and/or other sheet-like material). The material 13 is used to cover most of the exposed metal and other area requiring treatment of the operator's cab in an effort to reduce the sound level (or maintain high thermal insulating qualities, absorb vibration, or other) within the cab to the degree required. This enables an operator to work the vehicle for a longer time in compliance with laws prescribed by regulatory agencies with regard to ergonomic requirements. At the same time, however, by covering the interior of the vehicle, the various elements of the machinery or vehicle beneath the operator's cab are also covered so that the material 13 must be removed before access can be obtained for field servicing. In addition, the material 13 is relatively fragile considering the type or environment in which a heavy construction vehicle operates, and it may be removed periodically, either to steam clean the interior of the cab or to, for example, clean up oil spills, dust concentrations and/or other contaminents.

In practice, the adhesive-backed stud assemblies 12 are located on the interior surface of the walls and ceiling, as needed. To the extent possible, the stud assemblies are located in remote areas or toward adjacent panels so as to minimize the possibility, in the event of a vehicle accident, of an operator striking one of the fasteners. Further, it will be appreciated that in equipment of this type there is the possibility of a rollover and there is at least some chance that an operator could come into contact with a fastener during such an accident.

Figure 2:
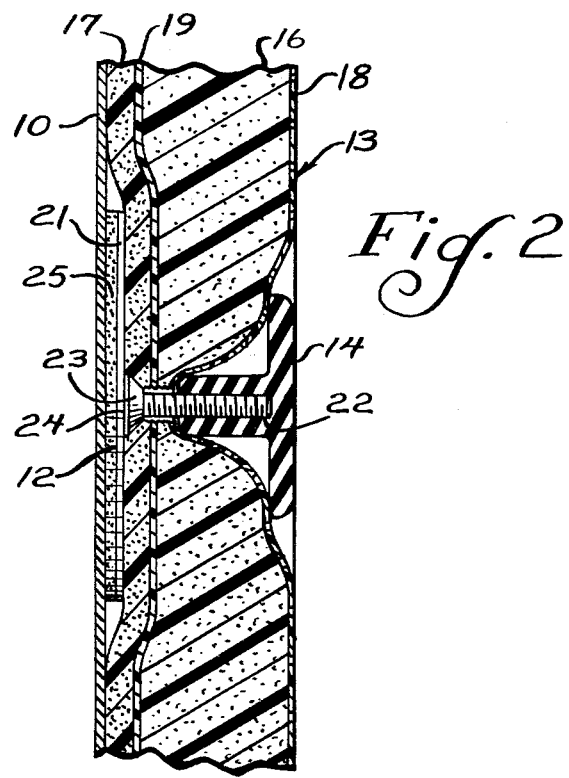
FIG. 2 is a fragmentary vertical cross sectional view taken through the sight line 2—2 of FIG. 1.

Referring now to FIG. 2, the material 13 is held to the adhesive-backed stud assemblies 12 by means of resilient buttons or caps 14 which are placed over and cover the stud assemblies. See U.S. Pat. No. 3,829,150 for a further description of the buttons 14. Equivalent holding means may equally well be employed.

The material 13 is of a type commercially available. It includes an outer, relatively thick layer 16 of flexible plastic foam, an inner, relatively thin layer 17 of flexible plastic foam, an outer perforated cover 18, and a relatively rigid but flexible bonding layer 19 joining the foam layers 16, 17 together. Alternative construction of the material 13 for whatever purpose may include the omission of the flexible bonding layer 19, and/or the omission of the perforated cover 18 as well as modifications in the basic material used.

Once the adhesive-backed stud assemblies 12 are placed on the panel 10, the material 13 may be impaled over the stud assembly 12 until the stud assembly 12 perforates the material. Alternatively, a small lead hold may be pierced and then the stud perforated through the material.

The stud assembly 12 includes a metallic disc-shaped base 21 and a helically threaded screw 22. The disc 21 is provided on its back with a resilient polyurethane foam backing 25 impregnated with a pressure-sensitive adhesive at 25A so that both surfaces may adhere. In addition, a release film 26 serves as a protective covering that can be easily removed from the foam 25 enabling immediate application of the stud assembly 12. The button 14 is impaled over the thread screw 22 thus firmly engaging the ridges of the screw. It will be appreciated that although the illustrated thread screw has a helical thread structure, circular grooves or other equivalent grooves may equally well be used in place of the helical thread.

The threaded screw 22 is attached to the metallic disc 21 by means of a conical offset interrupted by a circular opening 23 which is formed into the metallic disc 21. More specifically, the sides of the cone 23 are preferably at approximately 44° with the plane of the disc. The diameter of the base of the cone is approximately fifty-three one hundredths of an inch diameter (0.530) permitting the insertion of a No. 10 UNC cap screw whose countersunk angle is 80°-82° or equivalent to a depth of approximately 0.045 inches from the base of the cone and the screw thread protruding through the approximate two-tenths inch diameter circular interruption, truncating the cone. The approximate 44 degrees of the side of the cone creates an approximate 5 degrees void between the head of the screw and the conical upset of the disc. When bonded mechanically or chemically, the void is filled with the bonding agent which in turn acts as a reservoir permitting displacement of the screw or stud during an impact. The thread screw 22 is inserted into an opening provided, then chemically or mechanically bonded 24 to the cone 23. It will be appreciated that this construction facilitates the use of a multiple size of stud lengths so as to accommodate materials 13 of different thickness.

The metallic disc 21 may be made of any mild grade steel, aluminum or other metal or material. Hardness of the material is such that it preferably is soft enough to bend upon impact while at the same time strong enough to support the weight of the material 13. The thickness of the metallic disc 21 and thus the thickness of the right circular cone 23 is 20 gauge. Any appreciably greater thickness than this may not cause the stud to yield upon impact. The adhesive-backed stud assembly may be manufactured in any conventional manner, such as stamping, etc. The mounting plate may be of other configurations than circular to meet special installation requirements, but an application area in the range of 3 to 6.25 square inches is preferred.

The adhesive-impregnated resilient material 25 is of a type manufactured for Wilshire Foam Products, Inc. and is a proprietary product. It is identified as MT-8 and is supplied in sheet rolls with a protective paper (silicone coated) on one side and a five mil (0.005 inch) Mylar clear plastic release film 26 on the other. This latter item 26 remains with the assembly until just prior to installation in a vehicle. The silicone paper is removed when the adhesive disc is mounted to the back surface of the steel disc during manufacture of the stud assembly.

A principal advantage of the foam material 25 is that due to its easy deformation, it compensates for small variations in the walls or ceiling of the area being protected while insuring that the entire adhesive surface of the stud assembly will be in contact with the application surface. For this purpose, the thickness of the foam backing 25 may be about 1/16 in.

As mentioned above, the resilient foam material 25 is also used to absorb some of the energy in a vibration mode that would otherwise be transferred to the bonding media of the adhesive-backed stud assembly. The capability of the foam to absorb vibration enhances the holding power of the cement contact surfaces in that, in a vibrating mode, the elasticity lowers the acceleration forces. The dampening effect of the plastic foam combination of the adhesive structure decreases the factor of acceleration, hysteresis notwithstanding.

One of the desirable features of the adhesive/foam combination is that it has the ability to maintain its adhesive quality without substantial changes in structure of the cement, hardening, or adhesive power in extreme temperature ranges and aging.

The thickness of the adhesive/foam 25 is approximately one-sixteenth inch. It has been found that if the thickness is much less, it will not exhibit the holding strength nor the ability to cover over minor dents or ridges, nor more particularly, the endurance necessary to support the material 13. The diameter of the disc and foam is in the range 2 - 2 ¾ in. Similarly, if this resulting area of adherence is lessened, the supporting capability of the adhesive-backed discs is materially reduced. The diameter of the screw 22 is not critical, the dimensions of the button 14 may be adjusted to accommodate any size screw within reason.

It is important that the stud assembly 12 be designed such that upon impact the screw 22 will yield, either by bending or breaking, and/or the conical offset 23 will yield, either by bending or breaking before any portion of the stud perforates the body of the button 14. The resulting safety features become apparent. Yet, with the inventive fasteners, it has been found that the process of installing, removing and replacing sound-proofing material has been greatly facilitated because the button 14 can be installed simply by pushing it over the grooved stud, and it may also be removed by a simple retraction motion without having to unscrew it. No special tools are needed or required.

Having thus described in detail a preferred embodiment of the invention, persons skilled in the art will be able to modify certain of the structure which has been illustrated while continuing to practice the principle of the invention; and it is, therefore, intended that all such modifications and substitutions be covered as they are embraced within the spirit and scope of the appended claims.

We claim:

1. In apparatus for applying sheet-like material to areas of a vehicle surrounded by walls including a plurality of externally grooved stud assemblies secured at spaced locations to said wall and projecting inwardly thereof to provide a non-pointed distal end; a layer of said material covering the interior of said walls, said assemblies projecting at least partially through said material; and a button for each assembly, including a head and sleeve for fitting over an associated stud assembly and being held by the grooves thereof, the improvement wherein said stud assemblies comprise a flat, thin base, a grooved stud attached to said base and extending perpendicular to a front face of said base, a layer of flexible foam material on the back side of said base; pressure-sensitive adhesive coating on the exterior side of said foam material; and a release film covering said adhesive.

2. Apparatus as set forth in claim 1, wherein for each of said stud assemblies, said base comprises a disc-shaped plate with a conical offset formed in the center thereof truncated by an aperture in which said grooved screw is received and secured.

3. Apparatus as set forth in claim 1, wherein the application area of said assemblies comprising the adhesive-coated portion of said foam material is in the range of 3 to 6.25 square inches.

4. The apparatus of claim 2 wherein said foam material is impregnated with said adhesive.

5. Apparatus as set forth in claim 2 wherein said buttons are formed from a material soft enough to permit force-fitting of said sleeve over an associated screw without turning, said button material being of a hardness and cooperating with the thickness of said sleeve and said head to prevent perforation of the body of said button by said stud upon impact, prior to the yielding of said stud under said impact; and said stud is so designed that upon impact said screw or said cone configuration or the attachment to the screw yields by bending or breaking before any poriton of the stud perforates the body of the button.

6. Apparatus as set forth in claim 5, wherein said sheet-like material is selected from the class of materials having at least one of the properties of sound-proofing, thermal insulating, vibration absorbing, and decorative trim.

7. Apparatus as set forth in claim 1, wherein said sheet-like material is selected from the class of materials having at least one of the properties of sound-proofing, thermal insulating, vibration absorbing, and decorative trim.

* * * * *